April 17, 1962 P. HOPP ET AL 3,029,537
CARD HOLDER
Filed Jan. 20, 1958
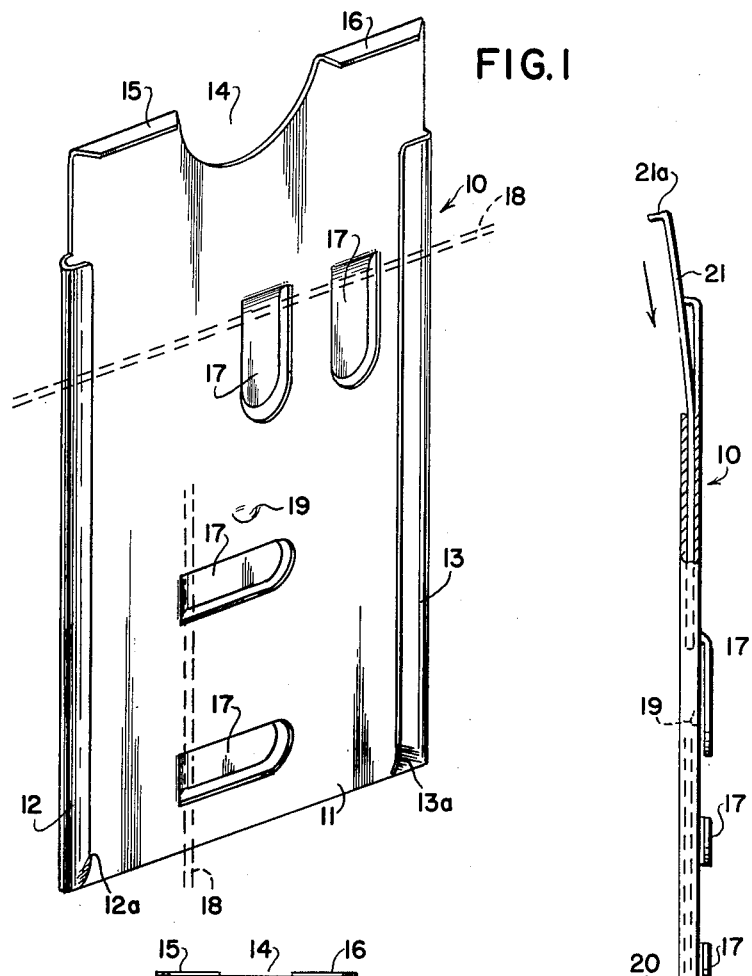
FIG. 1
FIG. 2
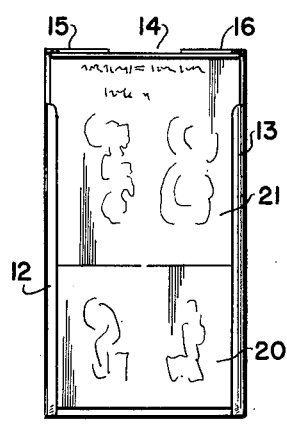
FIG. 3
INVENTORS
Philip Hopp
Estelle Mallman
BY
Kane, Dalsimer and Kane
ATTORNEYS

3,029,537
CARD HOLDER

Philip Hopp, New York, and Estelle Mallman, Bronx, N.Y., assignors to The Hopp Press, Inc., New York, N.Y., a corporation of New York
Filed Jan. 20, 1958, Ser. No. 709,945
3 Claims. (Cl. 40—17)

This invention relates generally to claim checks and holders therefor and more particularly to those claim checks and holders designed for use in connection with parcels which are claimed at a pick-up station in a shopping area.

In stores goods which have been purchased are often gathered in a basket which the purchaser leaves while the goods are wrapped, packaged or otherwise handled by the employees of the store. The purchaser then claims his goods at a parcel pick-up station. In large drive-in type stores the pick-up station is usually located at a remote point so that the purchaser can obtain his car from a parking lot while his order is being processed by the store employees. Thereupon, he is able to claim his parcel at the pick-up station and place the parcel immediately in his car thereby eliminating the necessity for carrying the parcel a great distance to the car parking lot. The advantages resulting are obvious, especially when the customer is a woman and the parcel is heavy or bulky.

In order to insure that the customer receives the proper parcel at the pick-up station, the parcels must be identified. Many methods of identification have been used. One method consists of leaving the parcel in a basket which is marked and having the customer identify the basket at the pick-up station when he desires to receive or claim the parcel contained therein. This method when used allows for quick and easy identification. However, certain problems have arisen in connection therewith having to do with the type of claim check used and the method of attaching the claim check to the parcel or basket.

The invention herein disclosed has as its principal object the furnishing of a parcel pick-up claim check and holder therefor which can be rigidly and permanently attached to a shopping basket.

Another object of this invention is to provide a holder for two identically marked parcel pick-up claim checks so that one claim check is permanently fastened to the shopping basket, and the other claim check can be removed from or inserted in the holder as desired.

A further object of this invention is to provide a parcel pick-up claim check holder which rigidly retains a claim check and yet will allow the claim check to be quickly and easily removed or inserted.

A further object of this invention is to provide a claim check and holder therefor which is complete in itself and inexpensive so that it may be produced and purchased at a comparatively low cost.

A claim check and holder therefor embodying the invention and the manner of using the same is described herein with reference to the drawings in which:

FIG. 1 is a front perspective view of the claim check holder which is the subject of this invention;

FIG. 2 is a side elevation of the claim check holder shown in FIG. 1 with one claim check inserted therein and a second claim check partially inserted therein; and FIG. 3 is a front elevation of the claim check holder shown in FIG. 1 with both claim checks fully inserted therein.

The holder or frame for the parcel pick-up claim check is designated in the drawings generally by the numeral 10. Frame 10 is formed of a rigid material such as a metal or heavy plastic and consists of a substantially rectangular body 11 with inturned side edges to provide opposed parallel channels at the sides thereof. The channels are designated by the numerals 12 and 13 respectively and are formed by folding over an extended portion on either side of body 11. It is noted that the channels 12 and 13 are of equal length and terminate short of the top of body 11.

The lower ends of channels 12 and 13 respectively are crimped and extend inwardly toward the adjacent face of body 11 of the frame. As shown in the drawings, the lowermost end of channel 12 is crimped at 12a and the lowermost end of channel 13 is crimped at 13a.

The uppermost portion of body 11 is formed with a semi-circular notch 14 in the center thereof extending from the top edge of body 11.

The top uppermost portion of body 11 is bent to form a right angle with body 11 at 15 and 16 as seen in the drawings so that either side of notch 14 has a top bend which extends from the notch to the respective side of body 11.

Body 11 has pressed-out portions 17 which are used for attaching the claim check frame to a basket in which are disposed the articles to be claimed. In the drawings, four of these pressed-out portions are shown and each consists of a substantially rectangular member which is disengaged from the body of the pick-up frame on the two long sides and one of the short sides, with the remaining side thereof integral with body 11 so that it can be placed upon the rim of the basket such as those shown in phantom in FIG. 1 and designated by the numeral 18.

Additionally, raised or punched out portion 19 is provided in body 11. The raised portion 19 extends upwardly towards the viewer in FIG. 1 and consists of a semi-circular opening formed in body 11 so that portion 19 can be raised from body 11 with a portion thereof integral therewith. Raised portion 19 is positioned on body 11 approximately slightly more than half-way from the top and its purpose will be explained later.

Parcel pick-up claim checks 20 and 21 are shown in the drawings. Parcel pick-up claim check 20 is the lower claim check and is a substantially rectangular member formed from plastic, or any other suitable rigid material, which possesses a degree of resiliency. When lower claim check 20 is positioned within the claim check holder it has both of its short ends disposed in the channels provided so that one end of lower claim check 20 is inserted in channel 12, and the opposite end of lower claim check 20 is inserted in channel 13. The claim check is maintained in position by means of crimped ends 12a and 13a of channels 12 and 13 respectively and raised portion 19 below which its upper edge lies.

The upper claim check is formed from the same material as the lower claim check and is substantially rectangular in form and designated in the drawings by the numeral 21. The upper edge of upper claim check 21 is folded over to form a right angle with the body of claim check 21. This upper edge is designated in the drawings as 21a and when the upper claim check is positioned within frame 10 as seen in FIG. 3, the upper edge 21a thereof co-operates with flanges 15 and 16 of frame 10 to maintain the upper claim check within the frame.

The lower edge of upper claim check 21 lies adjacent the uppermost edge of lower claim check 20 and the side edges of the upper claim check are disposed within channels 12 and 13, which as shown in the drawings, have a width slightly in excess of a card thickness. Also the lowermost portion of upper claim check 21 is raised slightly from body 11 of the parcel pick-up frame 10 due to raised portion 19 which the upper claim check 21 overrides as seen in the drawings.

Since upper claim check 21 is formed from a resilient material it can be inserted or removed from frame 10 as shown in FIG. 2 wherein the one surface of claim check 21 slides over and adjacent flanges 15 and 16 of the frame when the claim check is inserted into the frame or removed therefrom.

The manner of using the claim check and frame will now be explained in connection with the drawings. The upper claim check and the lower claim check are marked with identifying indicia such as numbers, letters, etc., and form an identification pair. Thus the lower claim check can be marked with a number and the upper claim check can be marked with the same number so that it is obvious that these are related members of a pair. Frame 10 is fastened upon a basket by means of cut-outs 17 so that it is rigidly attached thereto, and the lower claim check 20 is inserted substantially rigidly therein in a permanent manner as explained above. The upper claim check 21 is also inserted in the frame by inserting the sides thereof into channels 12 and 13 from the top in the direction of the arrows shown in FIG. 2. The resiliency of the check allows it to bend slightly so that it can smoothly override flanges 15 and 16 of the frame until its top bent edge 21a lies beneath them and its lower edge bears in contact with the top edge of the lower claim check. When it is in this position it is seen that the angular edge 21a of the claim check underlies flanges 15 and 16, while its lower end is flexed by portion 19. This will cause its edge zones to frictionally bear against the faces of channels 12 and 13 to retain it within the frame 10.

When a customer leaves the basket to be packed or to get his car or for any other reason, he simply removes the upper claim check 21 by inserting one finger of his hand on either side of the upper claim check so that one finger lies beneath top bend 21a of the claim check and another finger lies adjacent the rear side of the claim check and within notch 14. He then bends the claim check slightly away from the frame utilizing the resilient property of the material of which the claim check is composed and bends the claim check until it can override flanges 15 and 16. In other words, by means of notch 14 and the opened uppermost portions of channels 12 and 13, the claim check can be bent until it can override the upper flanges 15 and 16.

The customer then retains the upper claim check until he wishes to pick up the parcel at the parcel delivery station. When he does this he identifies his parcel by means of the upper claim check which is the mate of lower claim check on the basket and removes the contents from the basket. At the same time he returns the upper claim check into frame 10 so that upon removal of the parcels from the basket, the basket is ready for use again and the next person to use it can remove the upper claim check after inserting the parcels in the basket.

The pick-up checks need not be stored and no auxiliary handling is necessary since when not in use, they are firmly attached to the basket.

Thus, among others, the several objects in the invention as specifically aforenoted, are achieved. Obviously, numerous changes in construction and re-arrangement of parts might be resorted to without departing from the spirit of the invention as defined by the claims.

We claim:

1. A card display assembly including in combination a holder body having upper, lower and side edges, said side eges providing opposed channels open at their upper ends, a pair of flexible cards successively insertable into said holder by sliding them downwardly thereof with their side edge zones introduced into the upper channel ends to dispose the cards one above the other with their side edge zones retained within said channels, a raised portion extending outwardly from the face of such body midway between said channels and at a point above the upper edge of the lowermost card to prevent that card from moving upwardly of said body, the upper card having its inner face bearing in contact with said raised portion whereby an adjacent zone of the same is maintained thereby in an outwardly bowed position with the adjacent side edge zones of that card frictionally binding against the surfaces of the channels to thereby retain said upper card against accidental displacement from said body.

2. In an assembly as defined in claim 1, portions of the lower and upper edges of the respective upper and lower cards being in engagement, an outwardly extending part at the upper edge of said holder body and the upper edge zone of the upper card being also extended outwardly to provide a portion underlying the outwardly extending part of said holder with said cards mounted thereon.

3. In an assembly as defined in claim 2, the outwardly extending part of the holder being spaced upwardly from the upper channel ends to furnish a zone through which said cards may have their side edges introduced in those channels and said cards being flexible to an extent such that they may be bent to pass through the space existing between said holder part and upper channel ends.

References Cited in the file of this patent

UNITED STATES PATENTS

| | | |
|---|---|---|
| 447,708 | West | Mar. 3, 1891 |
| 653,672 | Goodwin | July 17, 1900 |
| 791,692 | Hesseltine | June 6, 1905 |
| 993,674 | Freeman | May 30, 1911 |
| 1,197,065 | Sand | Sept. 5, 1916 |
| 1,254,407 | Keppel | Jan. 22, 1918 |
| 1,888,811 | Talley | Nov. 22, 1932 |
| 2,334,487 | Greenway | Nov. 16, 1943 |
| 2,540,718 | Duskin | Feb. 6, 1951 |
| 2,547,673 | Thomason | Apr. 3, 1951 |
| 2,581,762 | Hesse | Jan. 8, 1952 |

FOREIGN PATENTS

| | | |
|---|---|---|
| 579,720 | France | Aug. 11, 1924 |